United States Patent [19]

Leva et al.

[11] 3,997,633
[45] Dec. 14, 1976

[54] CONTACT TOWERS WITH LEAK-PROOF SUPPORT OF IMPROVED PLATE SUBASSEMBLY

[76] Inventors: Max Leva, One Hodgson Ave., Pittsburgh, Pa. 15205; Joseph L. Leva, 1485 McFarland Road, Pittsburgh, Pa. 15216

[22] Filed: June 24, 1975

[21] Appl. No.: 589,906

[52] U.S. Cl. ............................................. 261/113
[51] Int. Cl.$^2$ ..................................... B01D 47/12
[58] Field of Search ......... 261/113, 114 R, 114 TL, 261/114 JP, 97

[56] References Cited
UNITED STATES PATENTS

| | | | |
|---|---|---|---|
| 1,749,266 | 3/1930 | Sontag | 261/113 |
| 2,582,826 | 1/1952 | Glitsch | 261/114 R |
| 2,611,457 | 9/1952 | Glitsch | 261/114 R |
| 2,860,860 | 11/1958 | Wilson | 261/113 |
| 3,367,638 | 2/1968 | Leva | 261/113 |
| 3,446,489 | 5/1969 | Leva | 261/113 |

FOREIGN PATENTS OR APPLICATIONS

| | | | |
|---|---|---|---|
| 1,215,606 | 1970 | United Kingdom | 261/97 |
| 929,030 | 1960 | United Kingdom | 261/97 |

*Primary Examiner*—Tim R. Miles
*Assistant Examiner*—Gregory N. Clements
*Attorney, Agent, or Firm*—Donn J. Smith

[57] ABSTRACT

A gas-liquid contact tower comprises a tower shell and a plurality of superimposed generally horizontal contact plates mounted in vertically spaced relation within the tower shell, with the plates being grouped into at least one subassembly thereof. A supporting and sealing arrangement is provided for removably supporting said plate subassembly within the tower shell and for preventing any of the contact liquid from bypassing the plate subassembly. The supporting and sealing arrangement includes a first annular component permanently secured and sealed to adjacent inner surfaces of the tower shell, and a second annular component joined circumferentially to the plate subassembly and sealed detachably and circumferentially to the first supporting and sealing component. An annular gasket arrangement is inserted generally between the first and second components of the supporting and sealing arrangement and is circumferentially loaded by a loading arrangement mounted on at least one of the components.

A contact plate subassembly for use in a contact tower comprises a top contact plate and a bottom contact plate, together with a number of intermediate contact plates. A plurality of spacing and sealing rings alternate with the plates. The top or bottom contact plate of the subassembly has a peripheral extension or flange for mounting purposes, and a stabilizing ring is secured to the mounting extension.

15 Claims, 7 Drawing Figures

CONTACT TOWERS WITH LEAK-PROOF SUPPORT OF IMPROVED PLATE SUBASSEMBLY

RELATED APPLICATIONS

The present application is similar in certain respects to our copending application for Preventing Wall Leakage In Contact Towers, Ser. No. 589,875, filed June 24, 1975 concurrently herewith.

The present invention relates to multiple-plate, vapor or gas-liquid contact towers of the type wherein a large number of contacting plates are arranged in spaced subassemblies of closely spaced plates. Contact towers of this general configuration are described in U.S. Pat. Nos. 3,075,752 and 3,367,638 granted to Dr. Max Leva and also in his copending application Ser. No. 367,133 for Gas-Liquid Contact Apparatus, filed June 5, 1973.

Although the invention is described primarily with reference to contacting vapor-liquid phases, the invention is generally applicable to towers handling gas-liquid phases and the like. The term "gas-liquid" when employed herein is therefore inclusive of the various "vapor-liquid" relationships applicable to contact towers.

In a typical, but non-limiting, application of contact towers, a feed stock of closely boiling liquid is introduced to the tower, often at a location adjacent the midpoint of its overall height. The feed stock can consist, for example, of ortho and para variants of numerous aromatic liquids. Other closely boiling miscible liquids in various proportions can also be introduced. Typically but not necessarily the feed stock of a distillation contact tower may consist of a mixture of miscible liquids having boiling points within one or 2° Fahrenheit. (In other contact towers applications, immiscible liquid, vapor-liquid, or gas-liquid feed stocks can be handled). Upon introduction to the contact tower, the higher boiling liquid descends to the bottom of the tower through numerous contact plates, while the lower boiling liquid vaporizes and, passing likewise through numerous contact plates, ascends to the top of the tower. A condenser-reflux arrangement supplies the liquid phase in the upper region of the tower, and a reboiler system supplies the vapor or gaseous phase in the lower reaches of the contact tower.

In high purity operations, a lower-boiling top product or distillate can be extracted from the top of the tower having only 20ppm or less of the higher-boiling component as a contaminant. Conversely the higher-boiling bottom product may contain only 20ppm or less of the lower-boiling component as contaminant.

A very serious problem arises in the operation of contact towers in that relatively small amounts of liquid, either from splashing or condensation at the tower walls, frequently descend along the inner wall surfaces of the enclosing vessel and thus bypass the many contact plates in the lower regions of the tower. This wall leakage can descend directly to the bottom of the contact tower where it will severely contaminate the bottom product. In high purity operations, it will be evident that a very minor amount of leakage at the inner wall surfaces of the vessel can contaminate the bottom product to an extent far beyond the aforementioned 20ppm or other specification of trace contamination.

Unfortunately the contact plates cannot be peripherally and permanently sealed to the inner wall surfaces of the contact tower as removability is prerequisite to cleaning and maintenance of the tower. Moreover, upon heating of the contact tower the shell or vessel walls and the perimetric edges of the plates expand unequally, which would disrupt any such permanent sealing.

It has been proposed to form bundles of contact plates joined by the tie-rods, with the plates separated by peripheral sealing rings. Each of the plate bundles are then sealed to the inner wall surfaces of the tower vessel by means of a large-diameter, resilient or elastic O-ring (contact towers typically are from one or two feet to ten or fifteen or more feet in diameter). The thermal cycling of the contact tower, however, causes the O-ring or other sealing ring or packing to lose much of its elasticity or resiliency, with the result that the aforesaid wall leakage develops within a comparatively short time. Many feed stocks employed in contacting towers cause the aforementioned O-rings or other packing arrangements to become relatively brittle which accelerates the development of wall leakage.

Differences in thermal expansions between the O-ring housing, the O-ring itself and the vessel walls likewise accelerate development of wall leakage. In many cases heating or thermal cycling of the contact tower causes distortion of the walls of the contact vessel to accentuate out-of-round tolerances to the extent that a leakage path can be formed even though the O-ring material has not entirely lost its elasticity or resiliency.

In those contact towers having spaced subassemblies of contact plates the wall leakage problem is aggravated by condensation of the vapor phase on the relatively cooler inner wall surfaces of the vessel between the plate subassemblies.

The thermal cycling of the contact tower together with attack by feed stock chemicals, causes the O-rings to shrink and harden over longer or shorter periods of time depending on the paticular feed stock and the material of the O-rings. In consequence, the O-rings can lose contact with the adjacent vessel walls at one or more locations about the periphery of the O-rings, with resultant wall leakage.

Another serious problem respecting contact towers is the proper support of the many contacting plates without the use of heavily constructed supporting hardware and other structural complexities, while providing quick and easy removability for maintenance purposes. At the same time the plates must be positively located within the contact tower, during its operation, in avoidance of any lateral, vertical, or circumferential movements, any of which would interfere with the proper plate-to-plate spacings and the proper orientation of their flow apertures with respect to apertures of adjacent plates.

In the past subassemblies of contact plates have been provided with a relatively heavy bottom supporting plate or foraminous grid which rested on lugs welded to the inner wall surfaces of the tower vessel. The heavy bottom plates added considerably to the weight of the plate subassemblies to make installation and removal thereof more difficult. In addition to providing nonuniform support for the plate subassemblies, the welded lugs interfered with removal of the subassemblies for maintenance purposes. The plate subassemblies usually were equipped with sealing O-rings or other packing arrangement extending peripherally of the top portion of each plate sub-assembly to further complicate the structure of the plate subassembly. In addition to the disadvantage of structural complexity, the O-ring sealing arrangement allowed the development of bypassing wall leakage, as described below.

The rather large number of contact plates has been assembled in the past through the use of rather heavy guide rods extending continuously through a relatively large number of the plate subassemblies. In addition to increased manufacturing and assembly difficulties introduced by the use of guide rods, incorporation of the guide rods introduced potential bypassing leakage paths for the liquid phase.

Another problem in the construction of contacting towers has been the required reinforcement of the vessel itself. In the past this has been accomplished more or less by brute force techniques, either by providing a vessel with undue wall thickness or by the use of external stiffening rings welded every six to ten feet along the overall height of the vessel. This problem is aggravated, of course, where the contact tower is operated at considerable wall loadings induced by large differential pressures with respect to ambient pressure.

Other problems encountered in the construction and operation of contact towers are concerned with the proper distribution of liquid radially over the plate subassembly (particularly the top plate thereof), either from the feed inlet or from the overlying plate subassembly. Previously, non-uniform distribution has lowered contact efficiencies and has resulted in splashing of sensitive seals with resultant bypassing leakage.

The aforementioned problems and difficulties of the prior art are solved by our present invention which provides an unprovided contact tower and a unique subassembly of contact plates. A number of the plate subassemblies can be positively mounted in spaced relation along the overall height of the contacting tower for positive and uniform support thereof while providing easy and quick removability. The structure of the plate subassembly has been considerably simplified by obviating the need for a heavily constructed bottom supporting plate or grid and for the aforementioned guide rods. The plate subassembly structure of the invention and the supporting and sealing means therefor also eliminates the need for the supporting lugs and O-ring seals of conventional contact tower constructions.

An arrangement for suspending and sealing one or more individual plate subassemblies at spaced locations within the contact tower is provided by the invention. Most importantly the suspending arrangement includes sealing means mounted in such fashion that the sealing material is relatively immune from attack by various components of the feed stock. The supporting and sealing arrangement for the plate subassemblies affords uniform peripheral support and positive location of each subassembly against any possibility of lateral, vertical or circumferential movements. The supporting and sealing arangement involves employment of a number of permanently installed supporting rings or annuli which do not interfere with removal of the plate subassemblies and associated hardware. The positive location and retention of the plate subassemblies obviates the need of the aforementioned guide rods or other locating components. The mounting arrangement of the plate subassemblies also includes means for uniformly and positively loading the gasket material or other sealing means associated therewith and for minimizing the exposed area of the gasketing material. The supporting rings of our novel subassembly suspending arrangement also afford a pronounced stiffening characteristic for the contact vessel walls. The stiffening effect is enhanced owing to spacing of the supporting rings or annuli every two to five feet (for most applications). Accordingly the vessel walls can be made much thinner and the external stiffening rings of conventional contact towers can be completely eliminated. Owing to the close placement of the aforementioned supporting rings, the latter rings can be much more lightly constructed than the conventional external stiffening rings.

Although the top plate of our novel plate subassembly is somewhat heavier constructed than the remaining contact plates of the subassembly, the very heavy construction of the conventional bottom support plate (which is not a contact plate) of conventional subassemblies is not required owing to the continuous peripheral support afforded by our invention at the top plate of the subassembly. Again in contrast to the conventional bottom support plate, our much thinner top support plate can serve additionally as contact plate of the tower.

In further accordance with our invention, our novel top supporting and contact plate is unexpectedly provided with an arangement for distributing and controlling the flow of the liquid phase to the remaining plate of each subassembly. Desirably the top supporting plates are provided with additional means for eliminating splashing of the liquid phase from the overlying plate assembly, or splashing of the feed stock liquid or the reflux liquid at that subassembly adjacent the feed or reflux inlet.

As shown more clearly by the forthcoming detailed description of our improved contact tower, the improved subassembly and its leak-proof suspension arrangement considerably enhance the liquid-vapor or -gas contacting efficiency of the tower.

We attain these desirable ends by providing in a gas-liquid contact tower the combination comprising a tower shell, a plurality of superimposed generally horizontal contact plates mounted in vertically spaced relation within sad tower shell, said plates being grouped into at least one subassembly thereof, supporting and sealing means for removably supporting said plate subassembly within said tower shall and for preventing any of said contact liquid from bypassing said plate subassembly, said supporting and sealing means including a first annular component permanently secured and sealed to adjacent inner surfaces of said tower shell and a second annular component circumferentially joined to said plate subassembly and detachably and circumferentially sealed to said first component, and gasketing means for preventing passage of fluid between said components, said gasketing means being inserted generally between said components and circumferentially loaded by loading means mounted on at least one of said components.

We also desirably provide a gas-liquid contact tower comprising a tower shell, a plurality of superimposed generally horizontal contact plates within said tower shell, said plates being grouped into vertically spaced subassemblies thereof, supporting and sealing means for removably supporting each of said plate subassemblies within said tower shell and for preventing any of said contact liquid from bypassing said plate subassemblies, said supporting and sealing means including a supporting ring sealed to adjacent inner surfaces of said tower shell, a suspending ring detachably secured to said supporting ring and having an inner periphery projecting inwardly of said supporting ring, the associated plate subassembly having a plate at one end thereof projecting radially outwardly of said subassembly, the radial projection thereof being detachably secured to the inward peripheral projection of said suspending ring, and annular gasket means inserted between said supporting ring and said suspending ring and between said suspending ring and said radial plate projection, said gasketing means being uniformly loaded at detachable junctions between said supporting ring and said suspending ring and between said suspending ring and said radial subassembly projection.

We also desirably provide a similar contact tower wherein a stabilizing ring is secured to said radial projection on a side thereof opposite from said suspending ring.

We also desirably provide a similar contact tower wherein said supporting ring and said radial projection are on one side of said suspending ring, and said gasket means is a continuous annular gasket member substantially coextensive with said one suspending ring side.

We also desirably provide a similar contact tower wherein said supporting and sealing means include a plurality of said supporting rings and plate sub-assemblies spaced along the height of said tower shell, said supporting rings being of sufficiently heavy construction as to reenforce said tower shell against substantial wall loading.

We also desirably provide a similar contact tower wherein said radially projecting plate is located at the upper end of the associated each plate sub-assembly so that said plate sub-assembly is suspended from said supporting and sealing means.

We also desirably provide a contact plate sub-assembly for use in a contact tower, said sub-assembly comprising a top contact plate and a bottom contact plate, a number of intermediate contact plates, a plurality of spacing and sealing rings alternating with said plates, one of said top and said bottom contact plates having a peripherally radial extension for mounting purposes, and a stabilizing ring secured to said extension.

We are not aware of any patent or literature reference disclosing any of the novel arrangements pointed out above.

During the foregoing discussion, various objectives, features and advantages of the invention have been set forth. These and other objectives, features and advantages of the invention together with structural details thereof will be elaborated upon during the forthcoming description of certain presently preferred embodiments of the invention and presently preferred methods of practicing the same.

In the accompanying drawings I have shown certain presently preferred embodiments of the invention and have illustrated certain presently preferred methods of practicing the same wherein.

Our invention is applicable to contact towers employed for a wide variety of vapor-liquid and gas-liquid applications. A typical but non-limiting application on the contact tower arrangement disclosed herein is described in our copending application (FIG. 1) entitled Preventing Wall Leakage In Contact Towers, SN 589,875, filed concurrently herewith.

Figure 1:
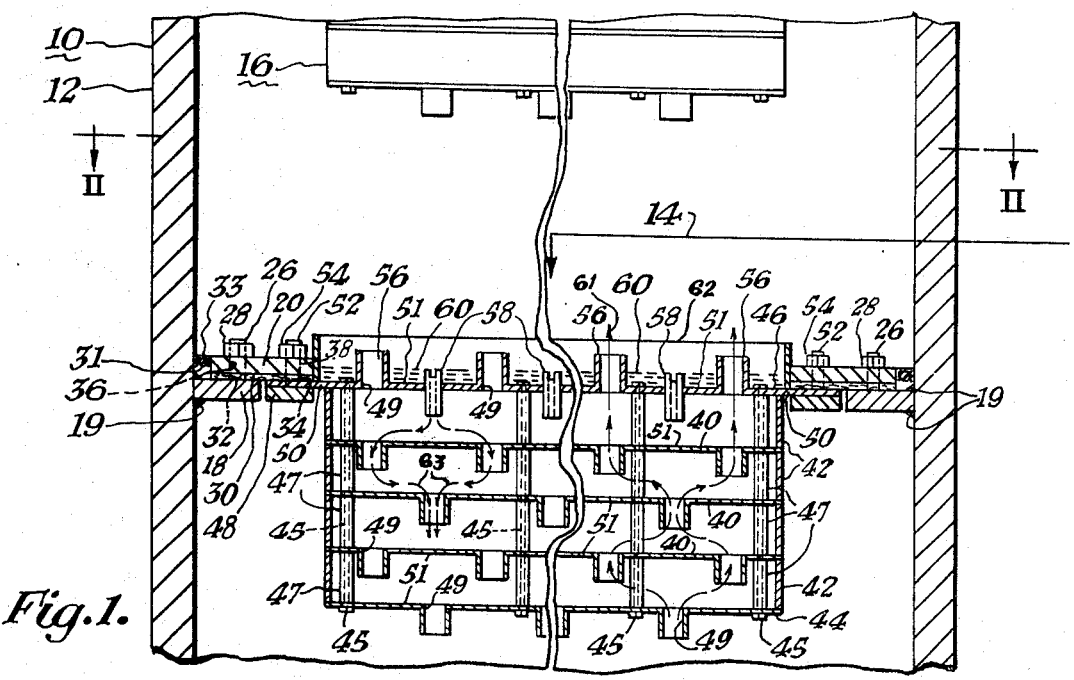
FIG. 1 is a partial, vertically sectioned view of one form of contacting tower arranged in accordance with our invention and illustrating our novel plate sub-assembly, together with novel means for supporting and sealing the sub-assembly within the tower vessel.
Figure 1A:
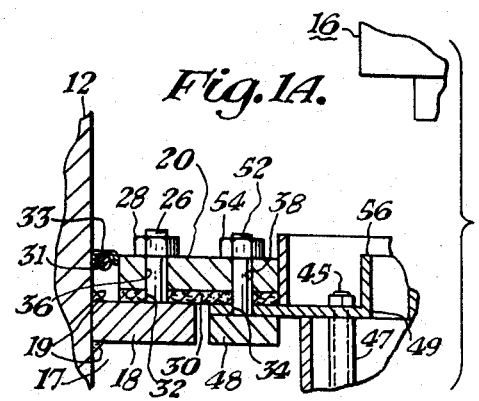
FIG. 1A is an enlarged view of a portion of the contact tower as shown in FIG. 1.
Figure 2:
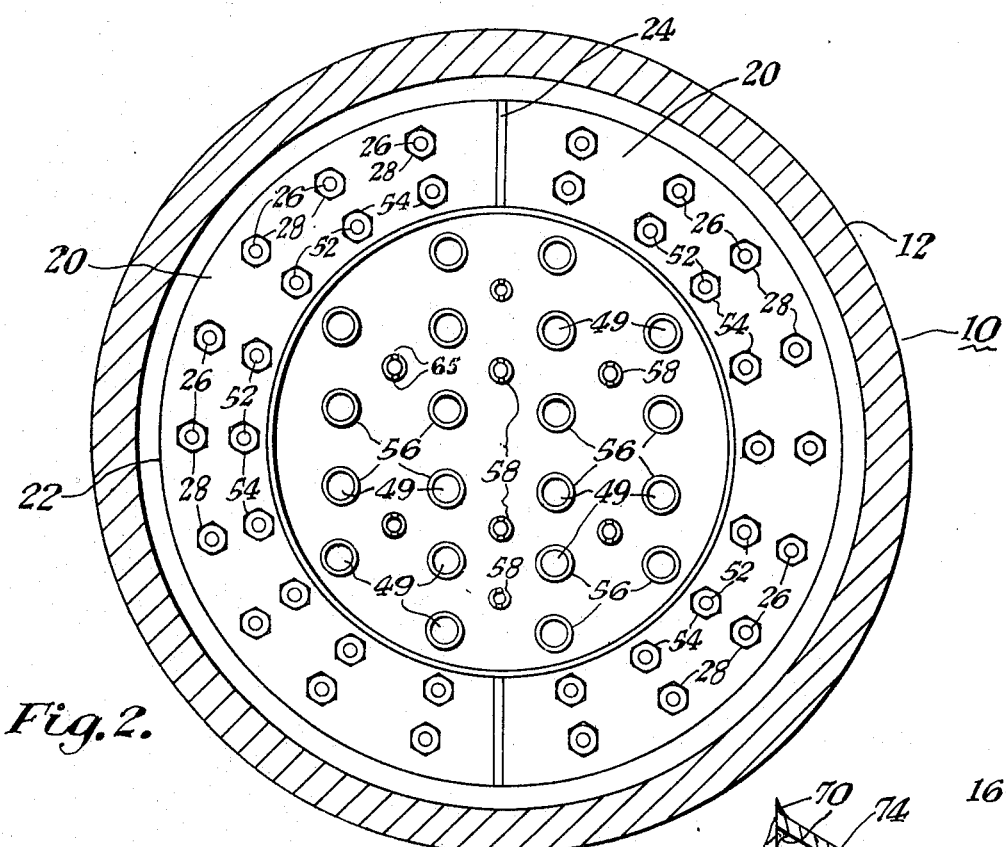
FIG. 2 is a cross-sectional view of the contact tower as shown in FIG. 1, and taken along reference line II—II thereof.

With reference now to FIGS. 1, 1A and 2 of the drawings, an exemplary contact tower 10 shown therein comprises a shell or vessel 12 to the mid-section of which a suitable feed stock can be introduced as denoted schematically by flow arrow 14. Where applicable the tower 10 can be of considerable height and can contain a large number of plate subassemblies, such as the subassemblies 16 spaced in tandem along the length or height of the shell 12. In other applications, the tower 10 can contain a single plate assembly.

Our invention includes, inter alia, a unique and surprising arrangement 17 for supporting and sealing the plate assemblies 16 within the shell 12, which at the same time eliminates the need for external reinforcing rings customarily employed on conventional tower shells. The supporting and sealing means include, generally, a first annular component peripherally and permanently secured and sealed to the inner wall surfaces of the tower shell 12, a cooperating second annular component joined to the associated plate subassembly and detachably joined to the first component, and a gasket loaded between the components.

Our novel supporting and sealing arrangement virtually eliminates the aforementioned wall leakage, with a minimum of hardward and gasketing materials. This is accomplished in accordance with one embodiment of our invention by welding a series of supporting rings or annuli 18 at intervals along the length of the shell 12. In typical applications the supporting rings 18 may vary between about two feet and about five feet in inter-ring spacing. In some applications, use of the supporting rings 18 can require the addition of about four inches to the diameter of the shell 12, which however is more than compensated by use of a thinner walled shell 12 and elimination of the aforementioned external reinforcing rings made possible by our invention. The supporting rings 18 provide more uniform reinforcement to the shell 12, as the supporting rings have a closer spacing than that customarily employed with the conventional external reinforcing rings. Thus, the supporting rings 18 can be relatively more lightly constructed (in comparison to external rings) but are still sufficiently heavily constructed to provide enhanced reinforcement for the shell 12 as well as enhanced support for the individual plate subassembly 16. In the later function of the supporting rings 18, it is most noteworthy that the supporting rings afford a uniform, or continuously peripheral support for the respectively associated plate subassemblies 16.

Each of the supporting rings 18 is permanently and sealingly mounted by one or more seal-welds 19 to eliminate any possibility of bypassing wall leakage between the seal rings 18 and the adjacent wall surfaces of the shell 12.

Overlying each of the supporting rings 18 is a suspending ring 20 desirably supplied in two or more slit ring parts 22 (FIG. 2) for ready removability. After installation, if desired, the split ring parts 22 can be temporarily welded at their junctions 24.

The suspending rings 20, during operation of the tower 10, are secured to the supporting rings 18 respectively by an outer row of detachable fasteners 26. The fasteners 26 can take a variety of forms such as bolts threaded into tapered apertures therefor in the supporting ring 18, or as illustrated, threaded stud fasteners 26 welded or otherwise secured to the supporting rings 18, to which the suspending rings 20 are secured by a series of machine nuts 28; or a combination of these. Through-bolts preferably are avoided, especially when handling liquids such as ether, which are capable of traveling along through-bolt threads and thereby bypassing the plate subassembly.

By permanently securing the securance studs 26 to the supporting rings 18, guides are thereby provided for assembly of the suspending rings 20 and the gasketing described below.

Underlying each of the suspending rings 20 are gasket means including a continuous gasket 30 fabricated from a suitable flexible or resilient material and provided with two circumferential arrays of bolt or stud apertures 32, 34. The gasket apertures are alignable with similarly disposed apertures 36, 38 in the suspending rings 20. The gaskets 30 and the suspending rings 20 can thereby be readily assembled onto the studs 26. After such assembly the gaskets 30 can be uniformly loaded by the susending rings 20 by proper tightening of the machine nuts 28 or other fasteners. Any possibility of wall leakage passing between the suspending rings 20 and the supporting rings 18 is virtually eliminated. At the same time the suspending rings respectively afford a uniform and peripheral support for the plate sub-assemblies 16 which will now be described.

If desired the major portion of the wall leakage can be prevented from contacting the outer edge surfaces of each of the gaskets 30 by means of an O-ring or other suitable packing 31 and retaining ring 33 secured in sections to the adjacent suspending ring components 22.

In the arrangement of our invention as illustrated in FIGS. 1 and 2, each of the plate sub-assemblies comprises a number of contact plates 40 alternating with a plurality of peripheral sealing rings 42. The numbers of contact plates 40 and sealing rings 42 can be varied from that illustrated, as required by a specific application of the invention. A relatively lightly constructed bottom plate 44 replaces the usual heavily constructed bottom support grid of known sub-assemblies. Owing to its light construction the bottom plate 44 can also serve as a contact plate. In certain applications of the invention the bottom contact plate 44 can be substantially as thin as the intermediate contact plates 40.

The plate sub-assembly 16 is completed by a top supporting or suspending plate 46 which is desirably of heavier construction than the bottom plate 44 but still relatively lightly constructed with respect to the bottom grid of known plate subassemblies. Accordingly the top plate 46 can also serve as a distributor plate and is, moreover, provided with novel liquid distributing and splash controlling arrangements in accordance with our invention and described below.

The assembly of contact plates 40, 44, 46 and peripheral sealing rings 42 can be held together by a series of tie rods 45 and spacing ferrules 47 after the manner, for example, disclosed in Dr. Leva's aforesaid copending application SN 367,133, now U.S. Pat. No. 3,928,513. Each of the contact plates 40, 44, 46 is provided with a series of flow apertures 49, which are desirably nonaligned with the flow apertures of adjacent plates for maximum contacting efficiency. The various plate apertures can be formed, shaped, and located after the manner of the last-mentioned copending application, and as shown in FIG. 2 of this application. The apertures 49 of each contact plate can be separated by portions 51 of plate material. At the apertures 49 of the intermediate plates 40 and the bottom plate 42 portions of the plate material are turned or extruded downwardly as evident from FIG. 1 of the drawing. This downward extension or extrusion of the plate material improves contacting efficiency by forcing a more intimate contact between the vapor-liquid phases or the gas-liquid phases, as the case may be. In contrast dam structures 56 are positioned around the top plate apertures 49 and extend upwardly.

The relatively light construction of the top supporting plate 46 primarily is made possible by use of a stabilizing ring 48 which can be respectively secured to overhanging peripheral or radially extending edge portion 50 of each top suspending plate 46. The radially extending portions of the top plate 46 and the stabilizing ring 48 in effect form a supporting and/or sealing flange of the subassembly 16'. In contrast to the widely spaced point supports afforded by the supporting lugs of conventional contact towers, the stabilizing rings 48, in cooperation with the supporting rings 18, provide a continuous peripheral support for the associated subassemblies 16, in addition to other advantages described herein. As the stabilizing rings 48 do not project outwardly of the lateral edges of the plate subassemblies 16, the stabilizing rings 48 can be supplied in one piece and if desired can be permanently secured to the undersurfaces of the associated top suspending plates 46, for installation and removal with the subassemblies 16.

Alternatively the stabilizing rings 48 can be mounted on the upper surfaces of the top plate extensions 50, which in turn can be suspended from the top surfaces of the suspending rings 18. In this case, each gasket 30 would be replaced by two gaskets (not shown). It is also contemplated that the bottom contact plate of each sub-assembly can instead be provided with the radial extension and stabilizing rings for suspension of the plate sub-assembly from a bottom rather than a top location. A bottom suspension, although advantageous, is less desirable owing to greater potential for entrapment of liquid.

In any event each of the stabilizing rings 48 is provided with a series of tapped apertures, or as illustrated, with a similar number of threaded studs 52 permanently secured thereto for reception of suitable fasteners. The studs 52 extend through suitable apertures therefor in the overhanging plate portions 50 and when the plate sub-assemblies 16 are installed in the tower 12, as shown in the drawings, the threaded studs 52 also extend through the aforementioned inner series of apertures 34, 38 in the associated gasket 30 and suspending ring 20 respectively. When thus assembled the gaskets 30 have sufficient differential diameter as to overlie the major proportion of the top plate extension 50 as well as the major proportion of the supporting rings 18. The gaskets 30 thereby can be loaded by machine nuts 54 or other fasteners when properly tightened on the studs 52. Securance of the machine nuts 54 or equivalent fastening devices also completes the suspension of the respectively associated plate sub-assemblies 16 within the tower shell 12. At the same time the doubly loaded gaskets 30 virtually prevent any possibility of wall leakage or of liquid splashings from by-passing any given one of the plate sub-assemblies 16.

In contrast to the intermediate and bottom plates 40, 44, the apertures 49 of each top plate 46 are each provided with upwardly extending splash shields, dams or chimneys 56 secured to the top suspending plate 46 and extending about each of the apertures 49 thereof. The splash shields 56, in a large measure, reduce the splashing of liquid falling upon the top plate 46 of each subassembly 16 either from the overlying plate assembly or from introduction of the feed stock (arrow 14). The apertures 49 and the dams or chimneys 56 afford egress for vapor (arrows 61) flowing upwardly through the plate sub-assembly 16.

In addition, the dams or chimneys 56 in conjunction with a number of relatively short downcomers 58 and circumferential dam 62 provide a constant head of liquid (denoted by liquid level 60) extending uniformly over the solid areas 51 of the suspending or distributing plate 46. Depending on its height, the dam 62 can serve as splash shielding with respect to at least some of the outwardly adjacent supporting and sealing components. Where the aforementioned splash shielding is not desired, the chimneys 56 can be of lesser height. The solid areas 51 of the suspending plates 46 and of the contact plates 40 extend uninterruptedly about the respective apertures 49. The apertures 49 of the contact plates 40 are provided with downwardly extending extensions or tubular extensions to promote intimate contact between the liquid and vapor phases.

The circumferential dam or splash shield 62 minimizes the exposure of the inward gasket edges to the liquid phase, in the event that highly corrosive or penetrative liquids (such as ether) are encountered. Where it is not important to minimize liquid contact at the seal or gasket 30, the dam 62 can be omitted and the liquid level 60 can be maintained by the suspending ring 20 and gasket 30. For most applications the positive and uniform loadings applied to the gaskets 30 are more than adequate for the complete exclusion of any by-passing liquid leakage.

The downcomers 58 (whose tops are desirably at a uniform elevation) can be provided in the form of discrete tubular sections tightly or sealingly fitted in apertures therefor in the otherwise solid areas 51 of the suspending plate 46. With this arrangement the liquid supplied to the suspending plate 46 is uniformly distributed to the solid plate areas 51 of the underlying intermediate plates 40 and is thereby uniformly distributed throughout each plate sub-assembly 16 (arrows 63) for maximum contact efficiencies.

The upper end portions of the downcomers or liquid-distributing tubes 58 are desirably slotted at 65 to ensure substantially uniform ingress for the liquid in the event that the suspending plate 46 is not exactly horizontal. The width of the slots 65 is selected such that the liquid level will remain essentially at the tops of the tubes 58 at normal feed rates, with liquids in the usual range of viscosities. For liquids in this range (e.g. up to $1^{-2}$ centipoises one slotted tube 58 can be employed for every four chimneys 56. In the case of higher viscosities, additional slotted tubes 58 (such as illustrated in FIG. 2) can be utilized.

Figure 3:
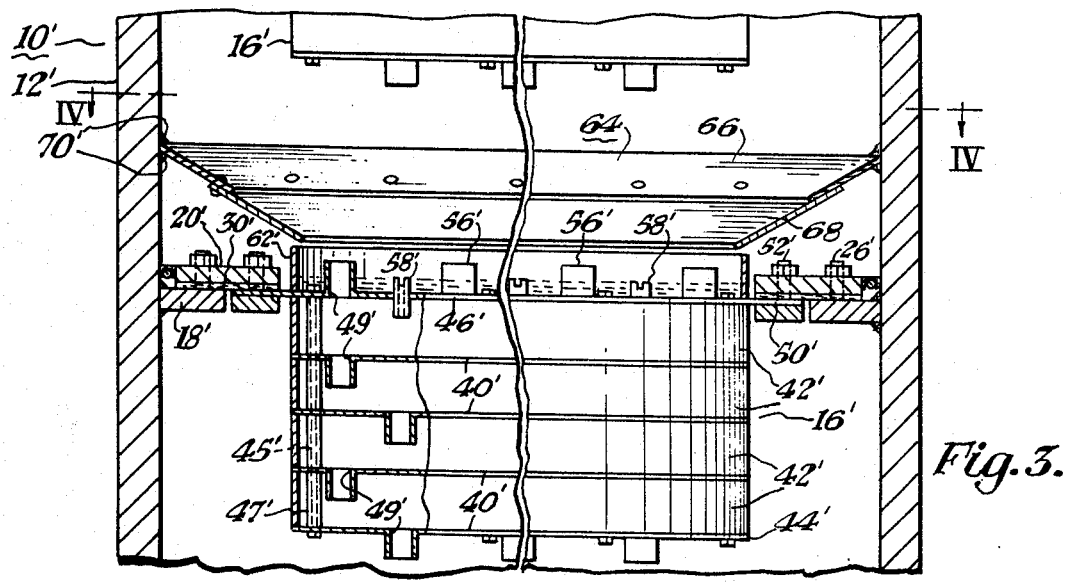
FIG. 3 is a partial, vertically sectioned view of another form of contact tower of the invention and showing mofified forms of our novel plate sub-assembly and the supporting and sealing means therefor.
Figure 3A:
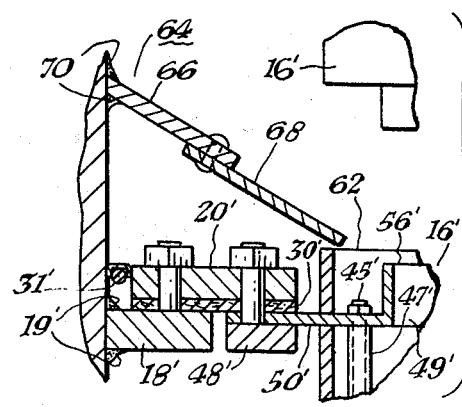
FIG. 3A is an enlarged view of a portion of the contact tower as shown in FIG. 3.
Figure 4:
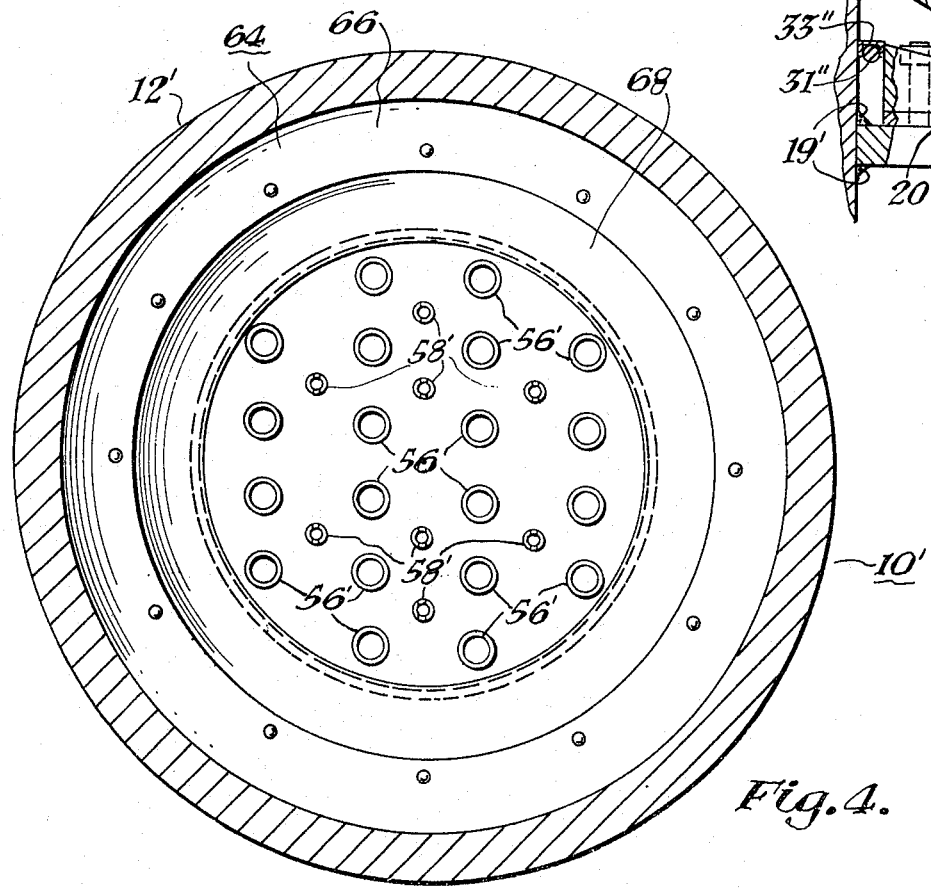
FIG. 4 is a cross-sectional view of the apparatus as shown in FIG. 3 and taken along reference lines IV—IV thereof; and, FIG. 5 is an enlarged, vertically sectioned partial view of another novel contact tower arrangement of the invention.

In FIGS. 3, 3A and 4 of the drawings, where similar reference numerals with primed accents denote similar components, a modified form of the top suspending plate 46' is employed in conjunction with other leakage and splash-deflecting means for the positive prevention of liquid reaching the gaskets 30'. The remaining structure of the plate sub-assemblies 16' and their supporting arrangements 18'-20' are essentially similar to the corresponding structures of FIG. 1 and will not be further described.

The suspending plate 46' includes the aforementioned peripheral dam or cylindrical baffle 62' extending continuously about its overhanging edge portion 50'. The baffle 62' is located inwardly of the suspending ring 20' but outwardly of the top plate apertures 49'. The peripheral baffle 62' can be provided in sufficient height as to preclude virtually all splashing of the adjacent edge of the gasket 30'. Depending upon composition of a particular feed stock, liquid contact at the outer edge of the gasket 30' can be substantially prevented by use of an O-ring seal or packing described in conjunction with FIGS. 1, 1A and 2 of the drawings.

Alternatively and preferably, any liquid contact at the gasket 30' is positively prevented through use of a frustoconical baffle arrangement denoted generally by reference numeral 64 and located in the space between each adjacent pair of plate sub-assemblies 16. Each baffle 64 can be provided in a one-piece arrangement after the manner of FIG. 5, or as shown in FIGS. 3, 3A in the form of overlapping upper and lower frustoconical sections 66, 68. The upper or larger baffle section 66 can be permanently seal-welded at 70 to the adjacent wall surface of the shell 12 and can be left permanently in place, as it does not project inwardly of the associated supporting ring 18'. As in the case of the suspending rings 20', the lower baffles 68 can be provided in two or more sections to promote removability and can be detachably secured to the upper baffles 66 as by bolting or the like. The lower edge portion of each lower baffle 68 overhangs the adjacent suspending plate dam 62' such that any splashing or wall leakage from the baffle arrangement 64 flows directly onto the top suspending plate 46' of the adjacent sub-assembly 16'.

Figure 5:
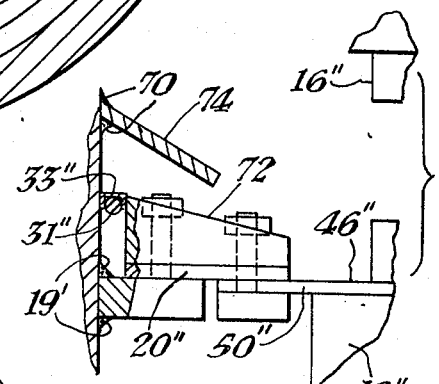

Another arrangement of our baffle and sub-assembly supporting and sealing arrangement is shown in FIG. 5 of the drawings. In the latter modification of our invention, the supporting and sealing means include a suspending ring 20'' provided with an upper, inwardly slanting surface 72 which cooperates with a relatively short frustoconical baffle 74 to deflect wall leakage and splashed liquid directly onto the top suspending plate 46'' of the plate sub-assembly 16''. If desired, a liquid deflecting O-ring 31' and retaining ring 33' can be employed, after the manner of FIG. 1. The sub-assembly 16'' otherwise can be constructed substantially as shown in FIG. 1. The liquid deflecting arrangement of FIG. 5, provides a more positive arrangement for deflecting both wall leakage and splash liquid directly onto the top plate 46'' of the associated plate sub-assembly 16''. The relatively short baffle 74 of FIG. 5 can be permanently installed, after the manner of FIGS. 3, 3A, if desired.

To facilitate installation and removal of each of the sub-assemblies 16, 16' or 16'' the top plates thereof can be provided with lifting rings or hooks (not shown), or other suitable lifting means. If desired the suspending rings 20, 20' or 20'' also can be provided with lifting means (not shown) for the same purpose.

From the foregoing it will be seen that novel and efficient Contact Towers With Leak-Proof Support Of Improved Plate Sub-Assembly have been disclosed and described. The descriptive and illustrative materials employed herein are utilized for purposes of exemplifying the invention and not in limitation thereof. Accordingly, numerous modifications of the invention will occur to those skilled in the art without departing from the spirit and scope of the invention. Moreover, it is to be understood that certain features of the invention can be used to advantage without a corresponding use of other features thereof.

I claim:

1. A gas-liquid contact tower comprising a tower shell, a plurality of superimposed generally horizontal contact plates within said tower shell, said plates being grouped into at least one subassembly thereof, supporting and sealing means for removably supporting said subassembly within said tower shell and for preventing any of said contact liquid from by-passing said subassembly, said supporting and sealing means including a supporting ring sealed to adjacent inner surfaces of said tower shell, a suspending ring detachably secured to said supporting ring and having an inner periphery projecting inwardly of said supporting ring, said subassembly having a plate at one end thereof projecting radially outwardly of said subassembly, the radial projection thereof being detachably secured to the inward peripheral projection of said suspending ring, and annular gasket means inserted between said supporting ring and said suspending ring and between said suspending ring and said radial plate projection, said gasketing means being substantially uniformly loaded at detachable junctions between said supporting ring and said suspending ring and between said suspending ring and said radial subassembly projection.

2. The combination according to claim 1 wherein a stabilizing ring is secured to said radial projection on a side thereof opposite from said suspending ring.

3. The combination according to claim 1 wherein said supporting ring and said radial projection are on one side of said suspending ring, and said gasket means is a continuous annular gasket member substantially coextension with said one suspending ring side.

4. The combination according to claim 3 wherein a stabilizing ring is secured to that side of said radial projection opposite from said suspending ring, said gasket member having an inner peripheral portion uniformly loaded between said suspending ring and said radial projection and stabilizing ring, and said gasket member having an outer peripheral portion thereof uniformly loaded between said suspending ring and said supporting ring.

5. The combination according to claim 1 wherein said supporting and sealing means include a plurality of said supporting rings and plate sub-assemblies spaced along the height of said tower shell, said supporting rings being of sufficiently heavy construction as to reenforce said tower shell against substantial wall loading.

6. The combination according to claim 1 wherein said radially projecting plate is located at the upper end of the associated each plate sub-assembly so that said plate sub-assembly is suspended from said supporting and sealing means.

7. The combination according to claim 1 wherein all of the plates of sub-assembly except said radially projecting plate are gas-liquid contact plates.

8. The combination according to claim 1 wherein said radially projecting plate is located at the top end of each plate sub-assembly, said top plate having a splash shield arrangement mounted thereon for minimizing liquid splashing of said supporting and sealing means including said gasket means.

9. The combination according to claim 8 wherein said splash shield arrangement includes a number of wall structures projecting upwardly from said top plate and surrounding respectively a like number of flow apertures in said top plate.

10. The combination according to claim 8 wherein said splash shield arrangement includes a peripheral dam structure secured to the radially projecting portion of said top plate and located closely adjacent said supporting and sealing means.

11. The combination according to claim 10 wherein a substantially frustoconical baffle arrangement is peripherally sealed in its upper edge to adjacent inner wall surfaces of said tower shell and has a lower edge thereof overhanging said peripheral dam structure.

12. The combination according to claim 1 wherein a substantially frustoconical baffle is peripherally sealed at its upper edge to adjacent inner wall surfaces of said tower shell, said baffle overhanging at least a portion of said supporting and sealing means.

13. The combination according to claim 12 wherein said suspending ring rests upon said supporting ring, and a lower edge of said baffle overhangs a portion of said suspending ring, an upper surface of said suspending ring being inclined inwardly and downwardly to deflect liquid from said baffle onto a top plate of said plate sub-assembly.

14. The combination according to claim 12 wherein said baffle arrangement includes a larger upper frustoconical section and a smaller lower frustoconical section, said upper frustoconical section having a lower edge overlapping an upper edge of said lower frustoconical section, said upper frustoconical section being permanently secured and sealed to adjacent wall surfaces of said tower shell and substantially coextending radially with said supporting ring, said lower frustoconical section being detachably joined to said upper frustoconical section for removability of said lower frustoconical section.

15. In a gas-liquid contact tower the combination comprising a tower shell, a plurality of superimposed generally horizontal contact plates mounted in vertically spaced relation within said tower shell, said plates being grouped into at least one subassembly thereof, supporting and sealing means for removably supporting said plate subassembly within said tower shell and for preventing any of said contact liquid from bypassing said plate subassembly, said supporting and sealing means including a first annular component permanently secured and sealed to adjacent inner surfaces of said tower shell and a second annular component circumferentially joined to said plate subassembly and positioned in substantial alignment with said first component, gasketing means for preventing passage of fluid between said components, said gasketing means being inserted generally between said components and circumferentially loaded by loading means mounted on at least one of said components, and means on said first component for supporting said second component thereat, said second supporting and sealing component including a peripheral flange extending outwardly from said plate subassembly and a suspending ring detachably and circumferentially joined to said flange and to said first component, said gasket means being circumferentially inserted between said first component and said suspending ring and between said suspending ring and said flange, said gasketing means being loaded by the detachable joining of said suspending ring to said first component and to said plate subassembly flange.

* * * * *